United States Patent [19]

Shirn

[11] 3,780,928
[45] Dec. 25, 1973

[54] APPARATUS FOR STRIPPING BRITTLE WIRE INSULATION

[75] Inventor: George A. Shirn, Williamstown, Mass.

[73] Assignee: Sprague Electric Company, North Adams, Mass.

[22] Filed: Dec. 23, 1971

[21] Appl. No.: 211,433

[52] U.S. Cl................ 228/13, 29/203 R, 81/9.5 B, 81/9.51, 228/18
[51] Int. Cl............................................ B23k 29/00
[58] Field of Search...................... 156/584; 269/96; 81/9.51, 9.5 R, 9.5 A, 9.5 B; 228/5, 13, 18, 57; 29/203 R

[56] References Cited
UNITED STATES PATENTS

| 274,232 | 3/1883 | Thayer et al.......................... 269/96 |
| 3,139,777 | 7/1964 | Gindoff................................. 81/9.5 |
| 3,374,117 | 3/1968 | Savage............................. 81/9.51 X |

Primary Examiner—Richard B. Lazarus
Attorney—Arthur G. Connolly et al.

[57] ABSTRACT

A weld of an insulated wire to a metal contact is produced by fracturing the insulation on the wire in a limited section between a pair of opposed hard, smooth surfaces to break the adhesion of the insulation to the wire followed by removing the split insulation and welding the wire cleared of insulation to the electrical contact. The removal of the insulation and the welding of the bare wire can be incorporated in a series of automatic steps for manufacturing an electrical component.

The apparatus for removing the insulation from the wire is a pair of opposing hard, smooth surfaces carried on means for reciprocally moving the surfaces toward and away from each other to receive, compress and then release a wire section inserted between them.

3 Claims, 4 Drawing Figures

PATENTED DEC 25 1973  3,780,928

APPARATUS FOR STRIPPING BRITTLE WIRE INSULATION

BACKGROUND OF THE INVENTION

This invention relates to the preparation of insulated wire for welding to terminal contacts and to apparatus for removing the insulated coating from a section of the wire to lay the wire bare for the welding operation. This invention also relates to the apparatus for removing the insulation which adheres to the wire.

The attachment of insulated wire to contacts in electrical components by welding requires the removal of the insulation at the point of the weld. During electrical component manufacture this insulation must be removed before a good weld can be achieved in every instance. Attempts have been made to solve the problem of removing this insulation or to find a way to insure good contact through the insulation. Removal of polyimide enamel insulation from a wire core has been found to be difficult. One difficulty has been that previously known techniques for removal of the insulation, either by chemical or mechanical means, have not been satisfactory.

It is, therefore, one object of this invention to provide a technique for removing a portion of the enamel coating from an insulated wire and to lay bare the wire for installation.

A further object of this invention is to provide a novel and improved apparatus for automatically removing insulation from wire coated with polyimide enamel.

Still another object of the invention is to provide apparatus for removing insulation coating and soldering the bare wire to electrical component terminals automatically and with rapid processing of electrical components.

SUMMARY OF THE INVENTION

According to the present invention an insulated wire for welding to a terminal of an electrical component is prepared by removing the insulation without cutting or melting and only in a limited section of the wire. The polyimide enamel coating on resistance wire is compacted under compression of a pair of opposing hard, smooth surfaces of glass members having a low coefficient of friction with the enamel coating. The adhesion of the coating is broken, the coating removed in the section compressed and the cleared wire is welded to a terminal.

The welding can be carried out on automatic machines in which the compacting by opposing glass jaws or rollers takes place followed by removal of split coating and then welding. Wire-wound resistors, for example, may be provided with an all-welded end cap in which the polyimide enamel insulated wire is wound on a ceramic core. The end of the insulated wire to be welded to the end cap has the insulation removed. The wire end is compressed to break the insulation which is then removed to permit welding.

The insulation removal apparatus preferably comprises a pair of opposed glass surfaces which are reciprocally mounted so as to separate and receive an insulated wire section and then close and bear on the section grasped between them with sufficient compressive force to compact and break the insulation.

BRIEF DESCRIPTION OF THE DRAWING

The objects and advantages of the invention will become more apparent upon consideration of the following description taken together with the accompanying drawings in which.

DESCRIPTION OF PREFERRED EMBODIMENTS

Figure 1:
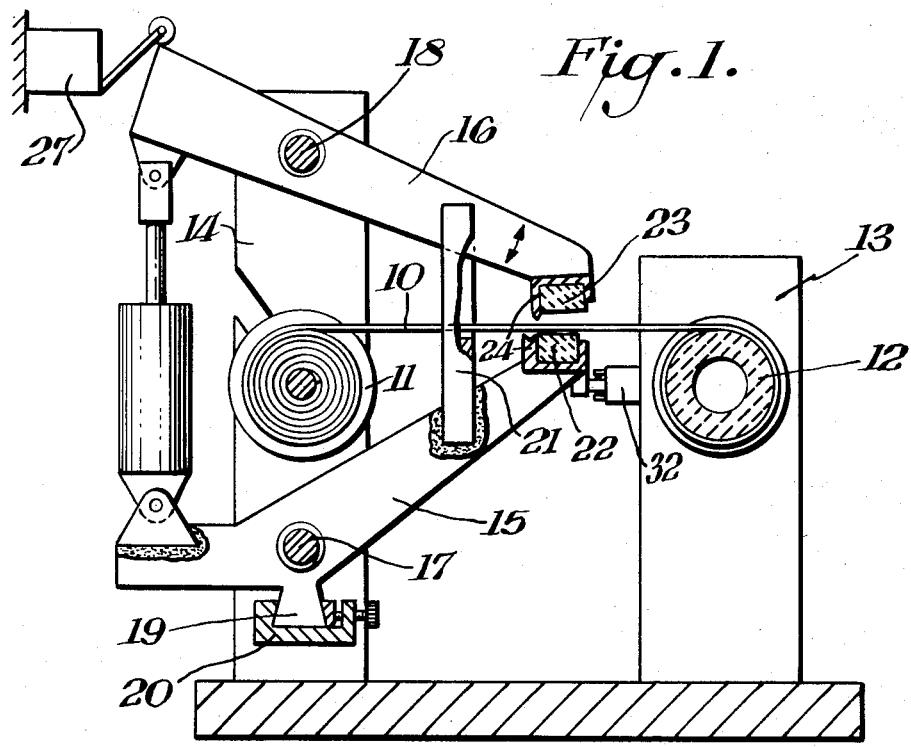
FIG. 1 is a schematic cross-sectional view in elevation of a device for the clean removal of the enamel coating from wire.

The device illustrated in FIG. 1 accomplishes core winding, controlled wire cutting and insulation enamel removal from the wire end to be welded. In FIG. 1 the insulated wire 10 is fed from a supply roll 11 and wound on a ceramic resistor core 12. The ceramic core 12 is rotatably supported in a bearing frame 13 and the supply spool 11 is likewise rotatably supported in a frame 14. Both the core 12 and spool 11 are interconnected by a suitable drive, whereby their relative speed and direction of rotation will be maintained. Two spaced arms 15 and 16 are disposed in a vertical plane, one below and one above spool 11. The arms 15 and 16 are respectively mounted on lead screw 17 and guide rod 18. The lead screw 17 is mounted in the frame and connected by a suitable drive means to spool drive. The arms 15, 16 though spaced apart are slidingly interconnected near their outer reaches, so that they can traverse the supply spool and maintain a constant vertical alignment synchronized with the payout of the insulated wire. The lower arm is caused to traverse via the driven lead screw 17, however the arm is prevented from rotating by a V-bar projection 19 extending downward from the arm 15 and into V-bed guide 20. Extending upward from either side of arm 15 are two brackets 21 that form a U-shaped guide channel. This U-shaped guide retains arm 16 within its reaches, thereby causing arm 16 to traverse aligned with arm 15 along guide rod 18.

The arm 16 is only arrested from traversing, it is however still allowed to move in an up-down motion as the arm is caused to rotate on guide rod 18 by activation of a prime mover connected to this arm. At the extreme reaches of arms 15, 16 are two glass blocks 22, 23 that serve as mating clamp jaws.

The arms also are provided with shearing blades 33 located adjacent the glass clamping jaws.

A sensing device 32 located to detect the predetermined end of spiral winding will stop the spool feed and the arms 15, 16 traversing the spool. The prime mover will be activated causing arm 16 to rotate downward in U-shaped guide 21 until contact is made with the insulated wire. The clamping action of the glass blocks 23 and 22 on the insulated enamel coating 24 causes the enamel to fracture and break clean from the wire core 26, resulting in a weldable surface free of any other processing. During the clamping action the wire is also cut in mating shear faces 33. Also in the full down position another sensing device 27 is activated allowing the arm to be raised at which time the drive motor reverses to return the arms to their initial location.

Figure 2:
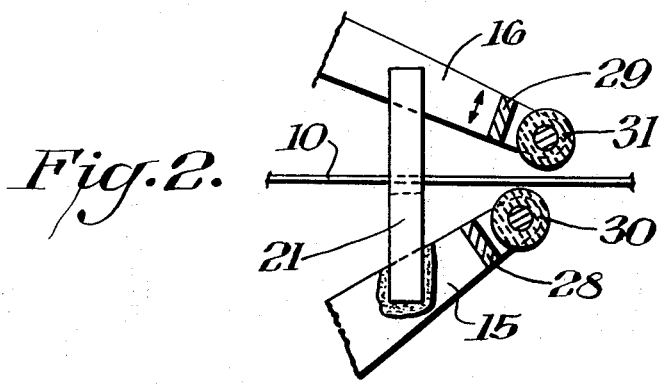
FIG. 2 is a fragmental view part of which is cross-sectioned illustrating another embodiment of this invention.

The apparatus described in reference to FIG. 1 illustrates one embodiment of this invention. A preferred embodiment of the compression means is a pair of rollers as illustrated in FIG. 2. For example, a pair of cylindrical rollers 30 and 31 may be rotatable mounted at the ends of the arms 15 and 16 adjacent members 28 and 29. The glass rollers provide the required relative coefficient of friction having both the smoothness and the hardness vital to the operation. The rollers are positioned so as to apply the necessary pressure required for good cleaning. The arms 15 and 16 are actuated substantially in the same manner as described above in reference to FIG. 1 to achieving the stripping action which is the object of this invention.

The insulated wire of the present invention is a coating which fractures and breaks clean from the core wire when compacted by the compression of glass surfaces diametrically pressed against the coating, such as polyimide enamel coating.

Figure 3:
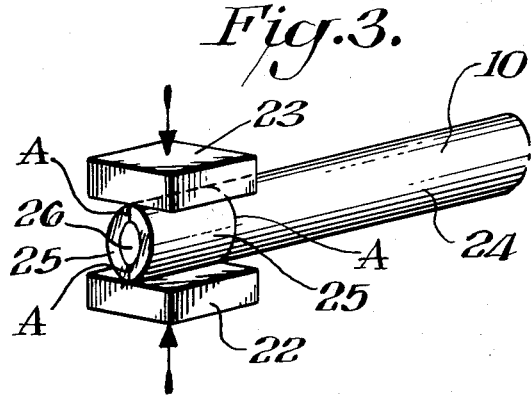
FIG. 3 is a perspective of an enamel insulated wire and apparatus according to this invention.
Figure 4:
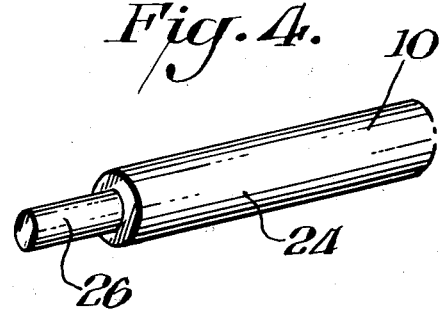
FIG. 4 is a perspective view of an insulated wire with a section of the insulation removed.

When the glass surfaces 22 and 23 are pressed against the coating 24 the insulation is split as shown at A in FIG. 3. The crushed insulation splits into two pieces 25 that provides a clean break away of the insulation from the wire core 26. The insulation splits at the top and bottom where the glass blocks contact of the wire and the insulation spreads cleanly away from the core wire 26 as shown in FIG. 4.

What is claimed is:

1. An apparatus for preparing a portion of insulated resistance wire with the insulation removed for mounting the wire in an electrical connection on an electrical component, which comprises the combination of a supply of wire coated with a brittle enamel, means for moving said wire, a first glass member having a hard, smooth glass surface forming a first jaw across which said wire is positionable, a reciprocable arm operated around a fulcum having thereon a second glass member having a hard, smooth glass surface forming a second jaw means attached to the reciprocable arm for reciprocal movement of the arm to move the jaws toward each other so as to grip the coated wire between the smooth glass surfaces, a compression means provided by the cooperating first and second jaws, a fracturable coating on the wire being engageable by pressure of the glass jaws and so that the coating splits away from the wire by the jaw pressure and is removable. and means for welding the bared portion of the wire to another member.

2. Apparatus as claimed in claim 1 wherein the enamel coating on the wire is polyimide enamel coating.

3. Apparatus as claimed in claim 1 wherein the members are rotatably mounted rollers and the surfaces are cylindrical surfaces on the rollers.

* * * * *